(12) United States Patent
Heike et al.

(10) Patent No.: US 8,339,061 B2
(45) Date of Patent: Dec. 25, 2012

(54) ILLUMINATING SYSTEM HAVING SEQUENTIAL COLOR FILTERING AND A HIGH-PRESSURE DISCHARGE LAMP

(75) Inventors: Florian Heike, Taipei (TW); Andreas Huber, Maisach (DE); Simon Lankes, Falkensee (DE); Andreas Osten, Concord, NH (US)

(73) Assignee: Osram AG, Munich (DE)

( * ) Notice: Subject to any disclaimer, the term of this patent is extended or adjusted under 35 U.S.C. 154(b) by 1522 days.

(21) Appl. No.: 10/522,896

(22) PCT Filed: Apr. 26, 2004

(86) PCT No.: PCT/DE2004/000870
§ 371 (c)(1),
(2), (4) Date: Oct. 25, 2006

(87) PCT Pub. No.: WO2004/098182
PCT Pub. Date: Nov. 11, 2004

(65) Prior Publication Data
US 2011/0095695 A1 Apr. 28, 2011

(30) Foreign Application Priority Data
Apr. 30, 2003 (DE) .................................. 103 19 571

(51) Int. Cl.
*H05B 37/02* (2006.01)

(52) U.S. Cl. ........................................ 315/291; 315/307

(58) Field of Classification Search .............. 315/209 R, 315/224, 291, 307, 246; 353/84–86, 94, 353/121
See application file for complete search history.

(56) References Cited

U.S. PATENT DOCUMENTS

| | | | |
|---|---|---|---|
| 5,608,294 A | 3/1997 | Derra et al. | 315/224 |
| 5,917,558 A | 6/1999 | Stanton | 348/739 |
| 6,278,244 B1 * | 8/2001 | Hevinga et al. | 315/291 |
| 6,400,511 B2 * | 6/2002 | Vanlier et al. | 359/634 |
| 6,520,648 B2 * | 2/2003 | Stark et al. | 353/85 |
| 6,586,892 B2 | 7/2003 | Derra et al. | 315/291 |
| 6,631,996 B2 | 10/2003 | Moench et al. | 353/85 |
| 2005/0151482 A1 * | 7/2005 | Riederer et al. | 315/291 |

FOREIGN PATENT DOCUMENTS

| | | |
|---|---|---|
| DE | 100 23 342 | 11/2001 |
| JP | 2001141725 A | 5/2001 |
| JP | 2002049097 A | 2/2002 |
| TW | 522280 | 3/2003 |
| WO | WO 95/11572 | 4/1995 |
| WO | 02/085009 A2 | 10/2002 |

\* cited by examiner

Primary Examiner — Jimmy Vu

(57) ABSTRACT

The invention relates to a novel operating method and corresponding ballast for illuminating systems having temporally sequential color filtering and a high-pressure discharge lamp operated by alternating current. In this case, at least three commutations of the lamp current are used within a color filtering sequence, in order to be able to operate the lamp advantageously without an excessive increase in the operating frequency of the color filter system.

12 Claims, 2 Drawing Sheets

ILLUMINATING SYSTEM HAVING SEQUENTIAL COLOR FILTERING AND A HIGH-PRESSURE DISCHARGE LAMP

TECHNICAL FIELD

The present invention relates to illuminating systems that have a high-pressure discharge lamp, operated by alternating current, and a color filter system. The term high-pressure discharge lamp is used in this case to distinguish the latter from low-pressure discharge lamps. However, the invention relates in particular to discharge lamps for projection applications that are operated, for example, with internal pressures in the region of 200 bars, that is to say particularly high pressures.

PRIOR ART

The color filter system, known per se, of the illuminating system is designed such that it filters the light from the lamp sequentially in time, use being made of a plurality of color filters, as a rule at least three color filters. As a rule, the temporally sequential color filtering is periodic, the sequence of the various colors remaining the same. Such color filter systems are used, in particular, for projection applications in conjunction with digital mirror devices (DMDs), in order to be able to use varying electronic control of the mirrors in various color phases to produce images with colors composed from the colors of the filter system. Use is made in this case of the fact that given a sufficiently rapid sequence of the various colors a mixed color impression is produced in the human eye. Such illuminating systems are known per se and are very widely used, in particular, in back projection visual display units and in so called beamers, that is to say front projection units (DLP "digital light processing"). However, the invention also relates very generally to an illuminating system having a high-pressure discharge lamp and a temporally sequential color filter system.

As a rule, the color filter systems in projection systems have a mechanical design in the form of a wheel rotating about an axis and consisting of filter segments, the light from the lamp being filtered by the rotating wheel, and the temporally sequential sequence resulting from the rotation of the various segments through the light beam. This is the reason why color wheels are frequently talked of in this technical field. The invention is not, however, restricted to such mechanical solutions, but can also be implemented by any other desired temporally sequential color filter systems.

In systems according to the invention, the operation of the color filter system and the operation of the lamp by alternating current must be synchronized with one another or jointly clocked and/or triggered.

SUMMARY OF THE INVENTION

The invention is based on the technical problem of specifying an improved method for operating such an illuminating system.

It is directed towards a method for operating an illuminating system having a high-pressure discharge lamp operated by alternating current, and having a color filter system that filters light from the lamp sequentially in time with the aid of a plurality of color filters, in the case of which method the alternating current supply of the lamp is commutated at least three times within a complete sequence of color filterings.

The invention is also directed toward an appropriately configured electronic ballast, an appropriately configured illuminating system that also comprises the color filter system in addition to the ballast, and, as a preferred application, a back projection visual display unit and a beamer.

Preferred refinements are specified in the dependent claims. Here, the features of the claims and the features disclosed in the following description are to be understood in each case with regard both to the nature of the method and to the nature of the apparatus of the invention without further expressly drawing a distinction in detail therebetween.

The invention is distinguished in that the alternating current supply of the lamp is commutated at least three times within a complete sequence, that is to say within a period of the color filtering in the case of a conventional periodic color filtering. The term "commutated" signifies the change in sign of the lamp current or the zero point between two consecutive lamp current phases of opposite sign.

In the prior art, the lamp has previously been operated by a periodic alternating current supply whose period is twice as long as the period of the sequential color filtering. As follows, for example, from the prior art in DE 100 23 342 A1, the background to this was that in the case of the projection systems considered with preference here it has meantime become widespread to introduce a comparatively short phase with an overincreased lamp current at the end of a phase of the lamp current lying in each case between two commutations. The electrodes of the lamp can be (re)configured or the lamp operation can be stabilized by this phase of overincreased lamp current. In addition to the cited document, reference may also be made to DE 100 21 537 A1 in relation to the details of the fundamental phenomena of the electrode burnback, which are known per se to the person skilled in the art. It has already been regarded as advantageous in this context always to assign the phase of overincreased lamp current to exactly one color filter, compare DE 100 23 342, paragraph 19, for example.

In a departure herefrom, the inventors have, on the one hand, found that the operating frequency of the color filter system frequently cannot be increased without serious disadvantages. Such disadvantages can be increased wear of a color wheel, or an increased development of noise. On the other hand, however, it has emerged that the lamp operating frequency or, expressed more effectively in more general terms, the mean commutation frequency of the lamp current, should not be too low. Otherwise, there is the risk of arc instability during light generation. The invention resolves this conflict of interests between low operating frequency of the lamp filter system, on the one hand, and increased commutation frequency of the lamp current, on the other hand, by at least threefold commutation of the lamp current within a period or, more generally, a complete sequence of color filtering.

As emerges in yet more detail from the following description, it is necessary in the representation of the invention not only to consider that nonperiodic ("temporally sequential") operating modes of the color filtering are also conceivable in principle, but that moreover lamp current phases separated by commutation need not be symmetrical precisely within the scope of this invention. In the actual mathematical sense, a period of the lamp current can also include far more than two commutations. However, what is important for the lamp operation is the commutations and not the strict periodicity, for which reason the invention already achieves an improved lamp operation by means of an increased mean commutation frequently.

A preferred aspect of the invention even provides that consecutive lamp current phases that are separated by a commutation differ at least partially from one another. In this way, they can be adapted in a particularly favorable way to the operating scheme of the color filter system and, if appropriate, also to the technical boundary conditions of the electronic control of the entire projection system. In particular, the so called lamp current pulse already mentioned with reference to the prior art, that is to say the temporal phase of overincreased lamp current, which preferably lies at the end of a lamp current phase bounded by two commutations, that is to say immediately before a commutation, can be used and/or varied in a particularly favorable way by means of this degree of freedom.

In the case of the generally widespread color filter systems, which in addition to the actual color filters also have a white or filter-free region, this overincrease pulse of the lamp current can be set at the start of this white phase of the color filtering. In the sense of this description, the white phase is also to be understood here as a filter phase of the color filtering. It is normally used to amplify the brightness, the remaining color filter phases being responsible for the actual color production and, in particular, the color saturation. The position of the overincrease pulse at least partially at the start of the white phase has the advantage that the correspondingly briefly increased light generation is not made evident by disturbances in the color production, in particular not by color imperfections of the projected image, for example color fringes. Moreover, for the control electronics it is substantially easier to process an increased light generation in the white phase, if desired.

A further alternative or additional possibility consists in setting overincrease pulses in interphases, sometimes denoted as spokes, between color filter phases. Such interphases can be used in order to block out or treat in a particular way at those times when the light from the lamp is filtered not only by one but two color filters. This is normally done by tilting the electronically controlled mirrors of a DMD, or by particular light mixing techniques. Thus, the color production requires only those time periods in which the light from the lamp falls through exactly one color filter, (including the white region). If, now, the overincrease pulse is set at least partially in such an interphase, the result that it has no disturbing effect, or only a lesser one, on the actual color filter phases through the increased light generation.

A particularly preferred application of the invention provides for a combination of both possibilities, that is to say overincrease pulses at the start of the white phase and in at least one interphase. In concrete terms, the exemplary embodiment shows in the interphase before the white phase an overincrease pulse that reaches into the white phase, and in each case an overincrease pulse in two further interphases. In the case of the exemplary embodiment, these two further interphases are those opposite (in the sense of a wheel) the white phase. Furthermore, an overincrease pulse is preferably provided in front of each lamp current commutation.

In the form described, the position and also the length of the overincrease pulses of the lamp current can thus be adapted to the operation of the color filter system by virtue of the fact that it is possible to select the interphases and the start of the white phase for the position, and furthermore on the one hand to keep the overincrease pulses within the interphases that are followed by an actual color filter phase, and on the other hand to lengthen the overincrease pulse before the white phase into the latter and to vary it inside the latter during operation.

In particular, in addition to the stabilization of lamp operation and electrode shaping, the invention in this case also permits control of the brightness or color saturation. Specifically, it has proved that the region of the mean length of all the overincrease pulses or of the length of the temporally variable overincrease pulse before the white phase, which region is favorable for lamp operation and for electrode shaping, is relatively wide. Consequently, in this favorable region it is possible by lengthening the overincrease pulse at the start of the white phase to increase the white component, and thus the brightness at the expense of the color saturation, or vice versa to increase the color saturation at the expense of the brightness in the event of shortening.

In a further preferred refinement of the invention, the polarity of the lamp current alternates not only over one of the said commutations, but mutually symmetrical lamp current phases of alternating polarity further adjoin one another. These lamp current phases each include two or more shorter lamp current phases each of the same polarity, or in other words contain in each case at least one commutation of the lamp current. This configuration of the lamp current, which is periodic for a lengthy time scale, is a particularly simple and favorable possibility of combining an individual adaptation of the phases between the commutations to the color filter system or boundary conditions of the control with the avoidance of a net DC component of the lamp current. In this case, a half period is respectively preferably assigned to a period of the color filter system. In other words: the period of the lamp current that is composed from mutually symmetrical half periods and thus corresponds to at least six commutations corresponds to twice the color filtering period.

Furthermore, it is hereby preferred for the purpose of avoiding restrictions to the variability of the overincrease pulses that the number of commutations per half period is uneven, preferably being three. Reference is made to the exemplary embodiment for the purpose of explaining the above details.

The prior art already cited in DE 100 21 537 A1 provides for the operating frequency of the lamp to be varied for the purpose of electrode shaping or stabilizing the lamp operation. By contrast therewith, it is preferably provided within the scope of this invention to make use for this purpose of the length and/or the height of the overincrease pulses already mentioned, but not of their frequency. Although it would also be conceivable in principle within the scope of the invention to vary the frequency, specifically either by appropriate cocontrol of the operating frequency of the color filter system or by omitting and inserting overincrease pulses into a lamp current time scheme otherwise remaining unchanged, it is, however, preferred to leave the lamp current time scheme (and also that of the color filtering) substantially unchanged, and to vary only the component of the overincrease pulse in the lamp current phase lying between the corresponding commutations of the lamp current, or to vary the height of the lamp current overincrease. This has proved to be technically simpler, and furthermore permits the insertion, preferably provided in any case, of an overincrease pulse before each commutation, and not only before some.

In concrete terms, it is preferred to vary (only) the pulse length (only) of the overincrease pulse lying before and at the start of the white phase, and thus to leave the remaining overincrease pulses unchanged. It can thereby be ensured that the remaining overincrease pulses preferably lying in the interphases remain inside these interphases, in which not very much time is available in any case. On the other hand, the overincrease pulse extending into the start of the white phase can be lengthened or shortened without serious effects because it does not impair the color mixing as such. Reference is made to the statements above in relation to this aspect.

Customary operating frequencies of color filter systems lie at 100 Hz-150 Hz, and so conventional lamp current frequencies lie between 50 Hz and 75 Hz. Thus, the invention leads here to at least a 300 Hz commutation frequency in the sense of the number of lamp current commutations per time unit (that is to say doubled by comparison with an effective lamp current frequency). However, in principle the invention would also permit the frequency of the color filter system to be slowed down. It has proved to be preferable in this context to set the commutation frequency of the lamp current as far as possible not below 180 Hz, preferably not below 200 Hz. Starting from these named values, particularly favorable operating conditions result in the lamp, and so it can very well be attractive to apply the invention with color filter system frequencies reduced in accordance therewith.

The electronic ballast generating the lamp current must be able to operate in the way according to the invention in a fashion tuned to the operation of the color filter system. It is possible for this purpose to make use in principle of an external clock signal for controlling the color filter system and the ballast, or else of a clock signal tapped at the color filter system (for example at a mark on the color wheel), or finally also of a clock signal generated by the ballast for controlling the color filter system. However, a ballast according to the invention preferably has a signal input for a corresponding digital clock signal that for its part is generated in the electronic control of a corresponding illuminating system, in particular a back projection visual display unit or a beamer. In particular, this can be a so-called SCI signal whose digital pulse edge, in particular the rising one, fixes the temporal position of a lamp current overincrease pulse, specifically preferably in a virtually instantaneous fashion. Furthermore, the temporal length of the digital SCI pulse prescribes the temporal length of the overincrease pulse. It can be provided in this case that the temporal length of a digital SCI pulse determines the temporal length not of the substantially simultaneous overincrease pulse of the lamp current, but of the one following thereupon. This prevents the SCI pulse from being able to last no longer than the overincrease pulse of the lamp current. Reference is made once again to the exemplary embodiment.

As already noted, the invention is directed not only to an operating method, but also to a correspondingly configured electronic ballast that, in response to a clock signal present for the operation of the color filter system and preferably applied from outside, can supply a high-pressure lamp with alternating current in conjunction with at least threefold commutation of the alternating current within a complete sequence of color filterings. It relates, in particular, to such a ballast in the commercially available form in which the latter is combined with the high-pressure lamp and the reflector thereof.

In addition, the invention relates to an illuminating system that in addition to the said ballast with or without lamp and reflector also includes the color filter system, specifically in the form, in particular, of a back projection visual display unit, for example a television set, or in the form of a beamer.

BRIEF DESCRIPTION OF THE DRAWING

The invention is explained in more detail below with the aid of a concrete example, in which case the features disclosed in the process can firstly be important both for the nature of the apparatus and for the nature of the method of the invention, and can also be essential to the invention in other combinations.

PREFERRED EMBODIMENT OF THE INVENTION

Figure 1:
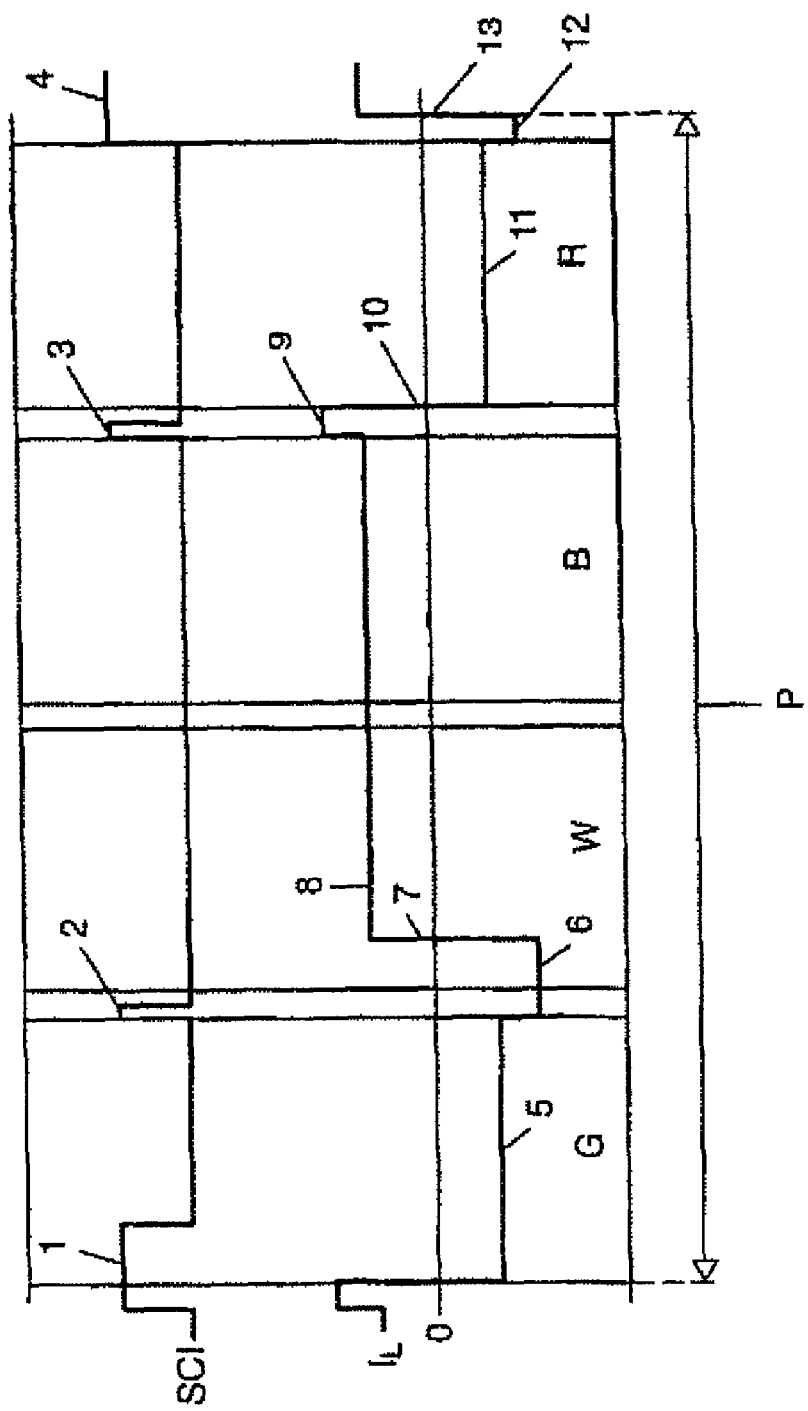
FIG. 1 shows a schematic timing diagram of an SCI clock signal controlling an electronic ballast according to the invention, and of a lamp current $I_L$ through a high-pressure discharge lamp.

In FIG. 1, the upper continuous line denoted by SCI illustrates a clock signal output by an inventive beamer, in concrete terms the electronic control thereof, and input into an input of a ballast according to the invention. This clock signal comprises digital pulses of the same height, but of different length, that are temporally consecutive. FIG. 1 shows four pulses 1, 2, 3 and 4, the pulses 1 and 4 having a large length of over 900 µs, and the pulses 2 and 3 having a small length of less than 150 µs.

Depicted lying therebelow is a continuous curve that is denoted by $I_L$ and represents the lamp current through a high-pressure discharge lamp. This lamp is supplied by the ballast, the ballast and lamp likewise being constituents of the beamer according to the invention.

The beamer further has a color filter system in the form of a color wheel that is conventional per se and includes four segments having the colors of blue, red and green as well as white (that is to say filter-free). The three color filters and the white region respectively form 90° segments of the color filter wheel and ensure a periodic sequence of the three colors and of white light during rotation of the color filter wheel and passage of a light bundle from the lamp. This sequence is illustrated in the FIG. 1 by the areas G, W, B and R that follow one another from left to right (in the direction of the time axis conceived from left to right), in which case it is correspondingly possible to add an area R in turn before the left-hand area G, and an area G in turn behind the right-hand area R. The period of the color filter system denoted in the FIG. 1 by P, which comprises all four areas G, W, B, R corresponds in this example to 8.3 ms, that is to say to a frequency of 120 Hz.

It may be seen that over the length of the color phases G the lamp current $I_L$ has a plateau denoted by 5 with the negative sign and, following thereupon, a comparatively shorter, and likewise negative plateau 6 of larger absolute magnitude. The plateau 6 is followed by a change in sign, that is to say a commutation of the lamp current $I_L$, that is denoted by 7. Following thereupon is a further plateau 8, which is a positive sign and of the same absolute magnitude as the plateau 5 and has a length that is clearly enlarged relative to the plateau 5. Following thereupon is a plateau 9 of the same absolute magnitude as the plateau 6, but of positive sign and otherwise substantially shorter. Following thereupon is a further commutation point 10, a plateau 11 corresponding to the plateau 5 and, following thereupon, a plateau 12 of the lamp current $I_L$ that corresponds to the plateau 6 in sign, but to the plateau 9 in length and is of the same absolute magnitude in relation to these two. Following thereupon is a commutation point 13. In this example, the lengths of the short plateaus 9 and 12 are in each case 220 µs, and the length of the plateau 6 is 660 µs. The remaining time lengths follow from the total duration of the period P.

The plateaus 5 and 6 correspond to a lamp operating phase between a commutation, taking place in time before the plateau 5 and not denoted, and the commutation 7, the plateaus 8 and 9 correspond to a further operating phase, of inverted sign in relation thereto, between the commutations 7 and 10, and the plateaus 11 and 12 correspond to an operating phase, again inverted in sign, between the commutations 10 and 13. In this case, the plateaus 6, 9 and 12 correspond to the phases, hitherto denoted as overincrease pulses, of overincreased lamp current, which are identical to one another in terms of absolute current magnitude. The use of the overincrease pulse 6 is clocked by the rising edge of the second SCI pulse 2, and is determined as regards the comparatively larger length by the length, likewise comparatively larger, of the first SCI pulse 1. Correspondingly, the use of the overincrease pulse 9 is determined by the rising edge of the SCI pulse 3 and the comparatively shorter length of the second SCI pulse 2. Similarly, the overincrease pulse 12 is determined in use by the rising edge of the SCI pulse 4, but in length by the shorter length of the SCI pulse 3.

Following the commutation 13 is a further half period, which is symmetrical in relation to the half period shown in FIG. 1, and is an inverted sign. The lamp current plateau indicated far right at the edge of FIG. 1 but not enumerated, thus corresponds, with inverted sign, to the lamp current plateau 5, and the overincrease pulse depicted far left in FIG. 1, but not enumerated, corresponds in an inverted fashion to the overincrease pulse 12. A complete period of the lamp current is thus 16.6 ms and has the mean current value 0. The lamp current is thus a pure alternating current.

The lamp is consequently operated with a mean commutation frequency of 60 Hz×3=180 Hz, whereas the prior art would provide a lamp operating frequency of 60 Hz for this example. Here, the individual lamp current phases 5, 6 and 8, 9 and, finally, 11, 12 respectively consist in a known way of a longer lamp current plateau 5, 8 and 11, respectively, and a subsequent shorter lamp current plateau 6, 9, 12 of larger absolute magnitude. The overincrease pulses 6, 9, 12 lie in this case in the interphases, indicated in FIG. 1 as interspaces between the color filter phases G and W, B and R as well as R and G, the overincrease pulse 6 reaching between G and W into the start of the phase W. The actual color filter phases G, B and R are thus not impaired by the overincrease pulses. The overincrease pulse 6 can be varied individually by differently extending the temporal extension into the phase W. The overincrease pulses 9 and 12, by contrast, remain of constant temporal length. In particular, the advantage of the arrangement of the overincrease pulses in the interphases can be combined in this case with a total time of the overincrease pulses that is nevertheless not temporally limited overall by the total length of the interphases, because a part of the white phase W is also used. This principally improves the brightness of the beamer, and is therefore regarded as advantageous.

The temporal lengthening of the lamp current plateau 8 by comparison with the plateaus 5 and 11 follows from the fact that no overincrease pulse is provided in the interphase between W and B, and also no commutation is provided at the start of the phase B. This has the advantage, in turn, that it is possible despite the overall even number of color wheel segments to achieve an odd number of operating phases of the lamp current, and thus a pure alternating current over the full period. In the case of a 3-segment color wheel without a white segment, as an example, all the interphases could be used for overincrease pulses and subsequent commutations. A variable control of the overall duration of the overincrease pulses would then be possible, for example, by virtue of the fact that a temporally constant portion of the overincrease pulses projects into the respective color filter phases, and the fraction inside the interphases is varied.

As to the further advantages and features of the invention, reference is made to the general description before the concrete outlining of the exemplary embodiment, which can also be understood more clearly with the aid of the exemplary embodiment without needing to be repeated here. Of course, the invention can be applied to a projection system in a large-format visual display unit, or can be used in any other application of an illuminating system with temporally sequential color filtering and a lamp operated by alternating current.

Figure 2:
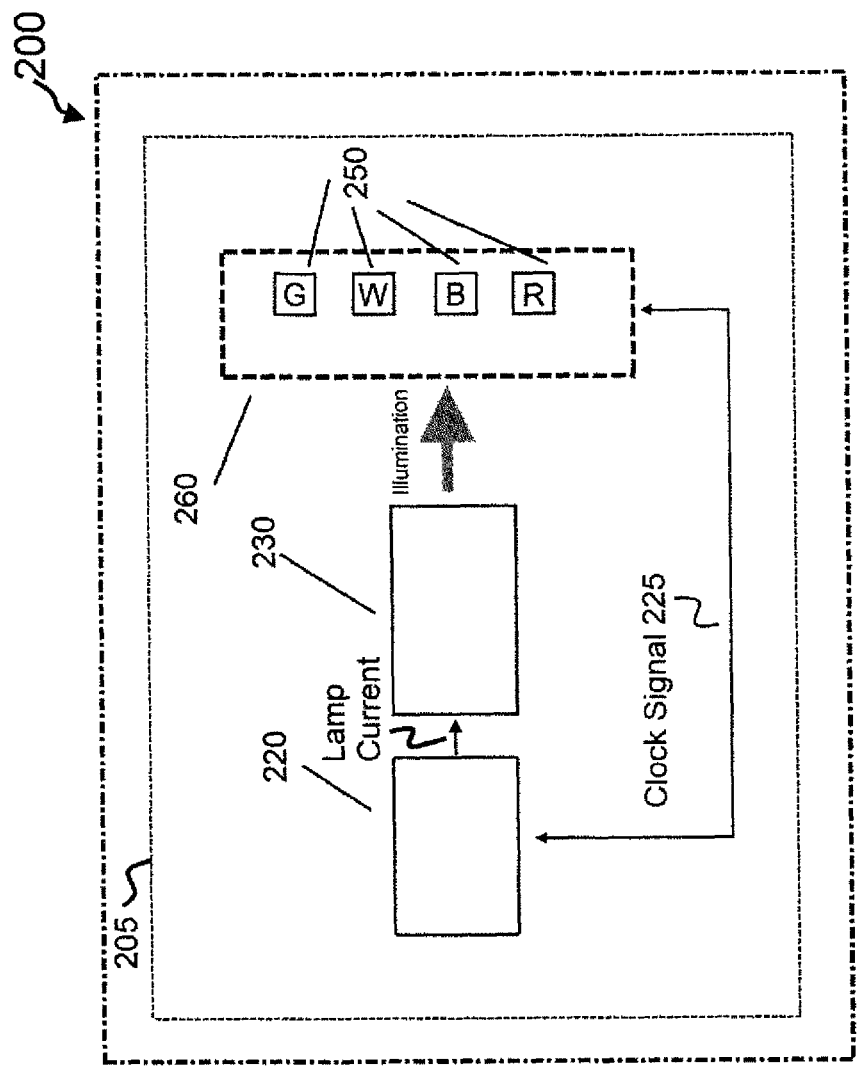
FIG. 2 shows an illuminating system.

FIG. 2 shows an illuminating system 205 that also comprises color filter system 260 in addition to ballast 230, and, as a preferred application, a beamer 200. Color filter system 260 is, in an embodiment, in the form of a color wheel 250 that is conventional per se and includes four segments having the colors of blue, red and green as well as white (that is to say filter-free). Lamp 230 is supplied by ballast 220, ballast 220 and lamp 230 likewise being constituents of beamer 200 according to the invention.

Electronic ballast 220 generating the lamp current must be able to operate in the way according to the invention in a fashion tuned to the operation of the color filter system 260. It is possible for this purpose to make use in principle of an external clock signal for controlling color filter system 260 and ballast 220, or else of a clock signal tapped at the color filter system (for example at a mark on the color wheel), or finally also of a clock signal 225 generated by ballast 220 for controlling color filter system 260. However, ballast 220 according to the invention preferably has a signal input for a corresponding digital clock signal that for its part is generated in the electronic control of a corresponding illuminating system, in particular a back projection visual display unit or a beamer 200.

The invention claimed is:

1. A method for operating an illuminating system having a high-pressure discharge lamp operated by alternating current, and having a color filter system that filters light from the lamp sequentially in time with the aid of a plurality of color filters, in the case of which method the alternating current supply of the lamp is commutated at least three times within a complete sequence of color filterings, wherein within spacings between commutations there is a spacing, there occurring a phase that is shorter by comparison with a substantially temporally constant lamp current over the large part of the spacings and has a lamp current increased by contrast therewith,
wherein there are, respectively provided between the individual color filter phases in the sequential sequence, interphases that cover the time period in which the light from the lamp is simultaneously filtered by two of the color filters, and in which the phases with an overincreased lamp current lie at least partially in these interphases.

2. The method as claimed in claim 1, wherein consecutive spacings between commutations of the lamp current differ from one another.

3. The method as claimed in claim 1, wherein a white phase without color filtering is included in the sequential sequence of the color filterings, and a phase of the overincreased lamp current lies at least partially in this white phase is free of color filtering.

4. The method as claimed in claim 1, wherein the phases with an overincreased lamp current lie directly before each lamp current commutation.

5. The method as claimed in claim 4, wherein four color filter phases including a white phase are provided in a temporal sequence of color filterings, and one phase of the overincreased lamp current lies in an interphase before the white phase and at the start of the white phase, and a phase of overincreased lamp current is provided in respectively two further interphases.

6. The method as claimed in claim 1, wherein the lamp current is periodic in time, and each period has two half periods which are symmetrical and of inverted sign and respectively correspond to at least three commutations of the lamp current.

7. The method as claimed in claim 6, wherein a half period of the lamp current corresponds to a period of the sequential color filtering.

8. The method as claimed in claim 3, wherein a length of the phase of at least one of the overincreased lamp current or the overincrease of the lamp current in this phase is varied for the purpose of at least one of electrode shaping or stabilizing the lamp operation.

9. The method as claimed in claim 8, wherein only the length of the phases of overincreased lamp current, and specifically only that of the phase of overincreased lamp current lying before and at the start of the white phase is varied.

10. The method as claimed in claim 1, wherein a mean frequency of the commutation of the lamp current is at least 180 Hz.

11. The method as claimed in claim 1, wherein the lamp current is generated by an electronic ballast that is tuned via a digital control signal to a sequential sequence of the color filterings, in which control signal has a pulse edge determines a temporal position of a phase of overincreased lamp current, and a pulse length determines a temporal length of a phase of overincreased lamp current.

12. The method as claimed in claim 1, wherein a length of the phase of at least one of the overincreased lamp current or the overincrease of the lamp current in this phase is varied for the purpose of at least one of electrode shaping or stabilizing the lamp operation.

* * * * *

UNITED STATES PATENT AND TRADEMARK OFFICE
CERTIFICATE OF CORRECTION

| | | |
|---|---|---|
| PATENT NO. | : 8,339,061 B2 | Page 1 of 1 |
| APPLICATION NO. | : 10/522896 | |
| DATED | : December 25, 2012 | |
| INVENTOR(S) | : Heike et al. | |

It is certified that error appears in the above-identified patent and that said Letters Patent is hereby corrected as shown below:

In the Specifications

In column 2, line 64: Replace "frequently" by "frequency".

Signed and Sealed this
Twenty-ninth Day of April, 2014

Michelle K. Lee
*Deputy Director of the United States Patent and Trademark Office*